United States Patent
Escudero Rodriguez et al.

(10) Patent No.: US 11,476,753 B2
(45) Date of Patent: Oct. 18, 2022

(54) SWITCHING CONVERTER

(71) Applicant: Infineon Technologies Austria AG, Villach (AT)

(72) Inventors: Manuel Escudero Rodriguez, Villach (AT); Matteo-Alessandro Kutschak, Ludmannsdorf (AT); David Meneses Herrera, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/307,456

(22) Filed: May 4, 2021

(65) Prior Publication Data
US 2021/0376741 A1  Dec. 2, 2021

(30) Foreign Application Priority Data
May 27, 2020  (EP) .................................... 20176781

(51) Int. Cl.
*H02M 1/36* (2007.01)
*H02M 3/335* (2006.01)
*H02M 1/00* (2006.01)

(52) U.S. Cl.
CPC .......... *H02M 1/36* (2013.01); *H02M 3/33573* (2021.05); *H02M 3/33584* (2013.01); *H02M 3/33592* (2013.01); *H02M 1/0058* (2021.05)

(58) Field of Classification Search
CPC ...... H02M 1/36; H02M 1/0058; H02M 3/335; H02M 3/33569; H02M 3/33573; H02M 3/33576; H02M 3/33584
See application file for complete search history.

(56) References Cited

U.S. PATENT DOCUMENTS

2016/0149498 A1    5/2016  Wu et al.
2019/0027950 A1*   1/2019  Carrizales ......... H02M 3/33584
(Continued)

FOREIGN PATENT DOCUMENTS

EP    3151407 A1    4/2017
JP    2014007942 A  1/2014

OTHER PUBLICATIONS

Escudero Manuel et al: "Modulation Scheme 1-15 INV, for the Bidirectional Operation of the H02M1/36 Phase-Shift Full-Bridge Power Converter", H02M3/335IEEE Transactions on Power Electronics, H02M3/337 Institute of Electrical and Electronics Engineers, USA, ADD. vol. 35, No. 2, H02M1/001 Feb. 2020 (Feb. 1, 2020), pp. 1377-1391, XP011758084, ISSN: 0885-8993, DOI: 10.1109/TPEL.2019.2923804 [retrieved on Nov. 15, 2019].
(Continued)

*Primary Examiner* — Gary L Laxton
(74) *Attorney, Agent, or Firm* — Armis IP Law, LLC

(57) ABSTRACT

A phase-shifted full bridge (PSFB) switching converter includes a transformer having a primary winding and a secondary winding; an input capacitor coupled to the primary winding via a first transistor full bridge; an output inductor coupled to the secondary winding via a synchronous rectifier circuit including at least one first transistor and at least one second transistor; and a controller circuit for generating switching signals for the rectifier circuit to operate the PSFB switching converter in reverse direction. During a startup phase, at the beginning of which the input capacitor is substantially discharged, the at least one first transistor is switched on in each switching cycle to allow an inductor current to pass from an output node, via the output inductor and the secondary winding, to a ground node, the at least one first transistor is again switched off when the inductor current reaches a threshold value.

17 Claims, 5 Drawing Sheets

(56) References Cited

U.S. PATENT DOCUMENTS

| | | |
|---|---|---|
| 2019/0202300 A1 | 7/2019 | Pastor et al. |
| 2020/0076318 A1* | 3/2020 | Moon ............... H02M 3/33592 |
| 2021/0135581 A1* | 5/2021 | Rajashekara ....... H02M 1/4241 |

OTHER PUBLICATIONS

European Search Report, EP 20 17 6781, dated Oct. 29, 2020, pp. 9.

* cited by examiner

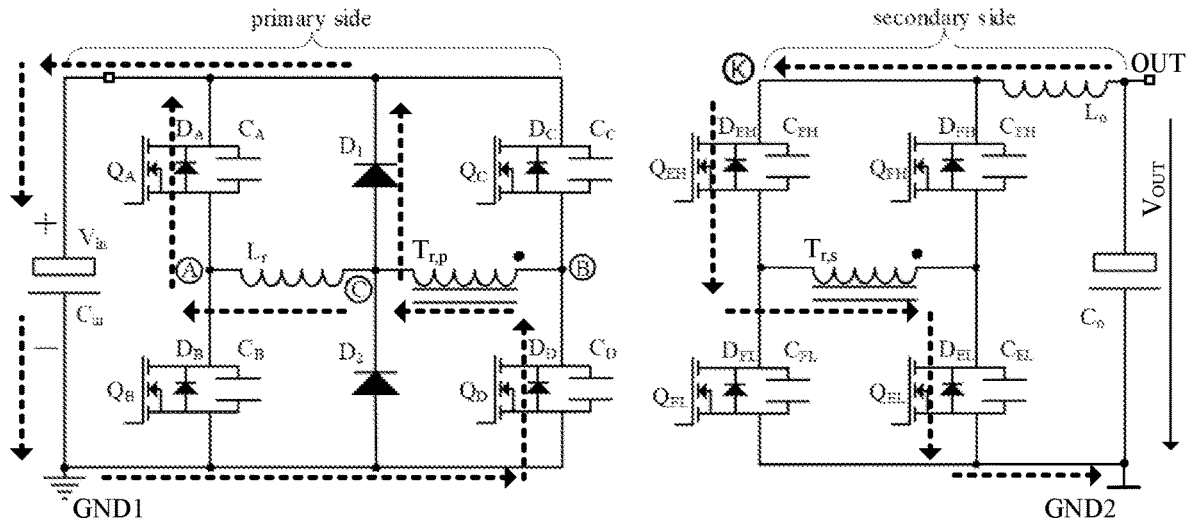
FIG. 3    (current flow from $t_0$ to $t_1$)
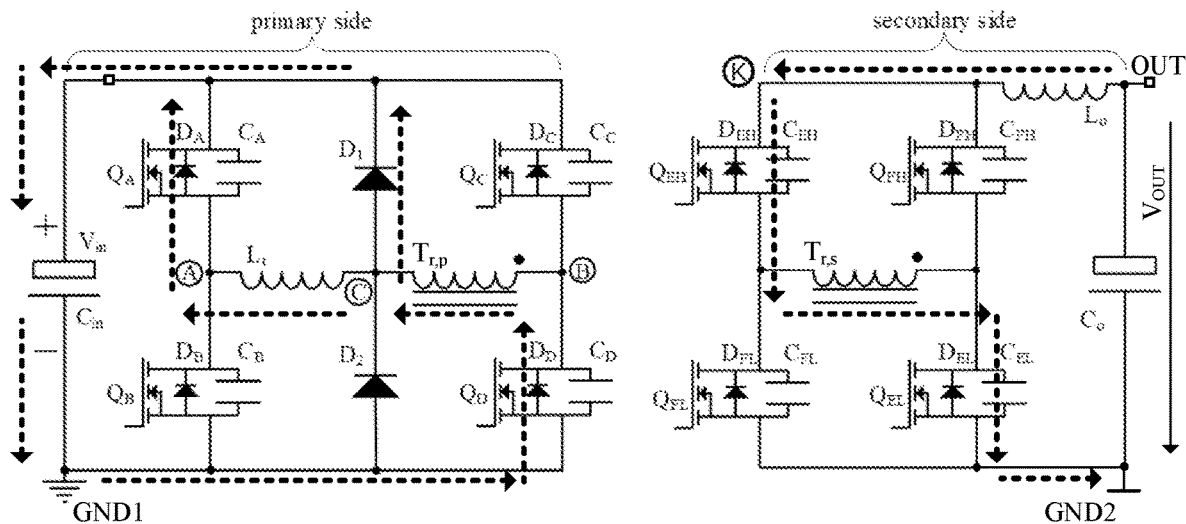
FIG. 4    (current flow from $t_1$ to $t_2$)

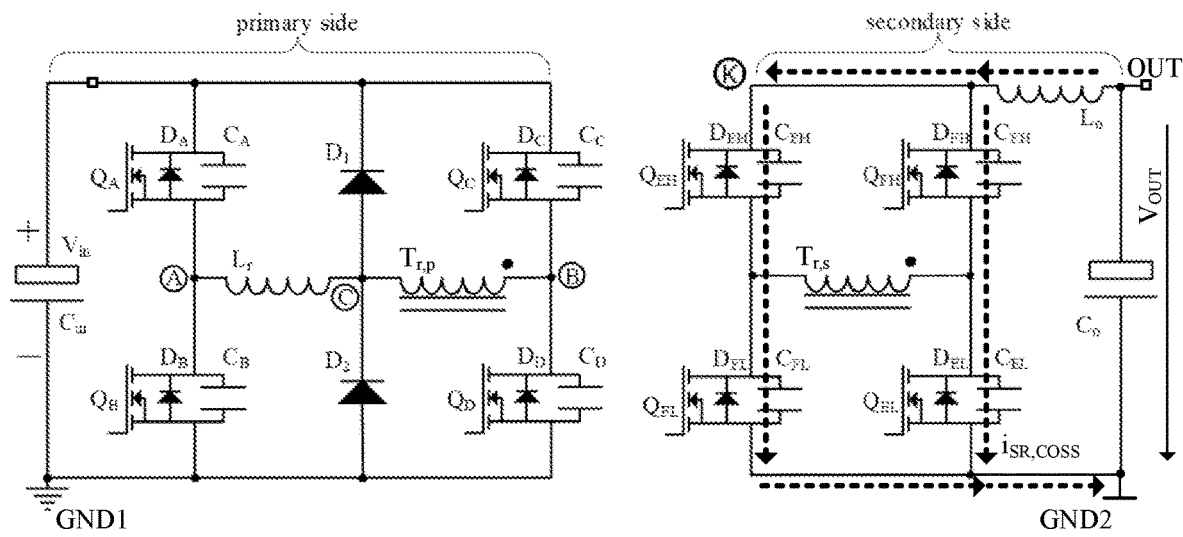
FIG. 5   (current flow from $t_2$ to $t_3$)
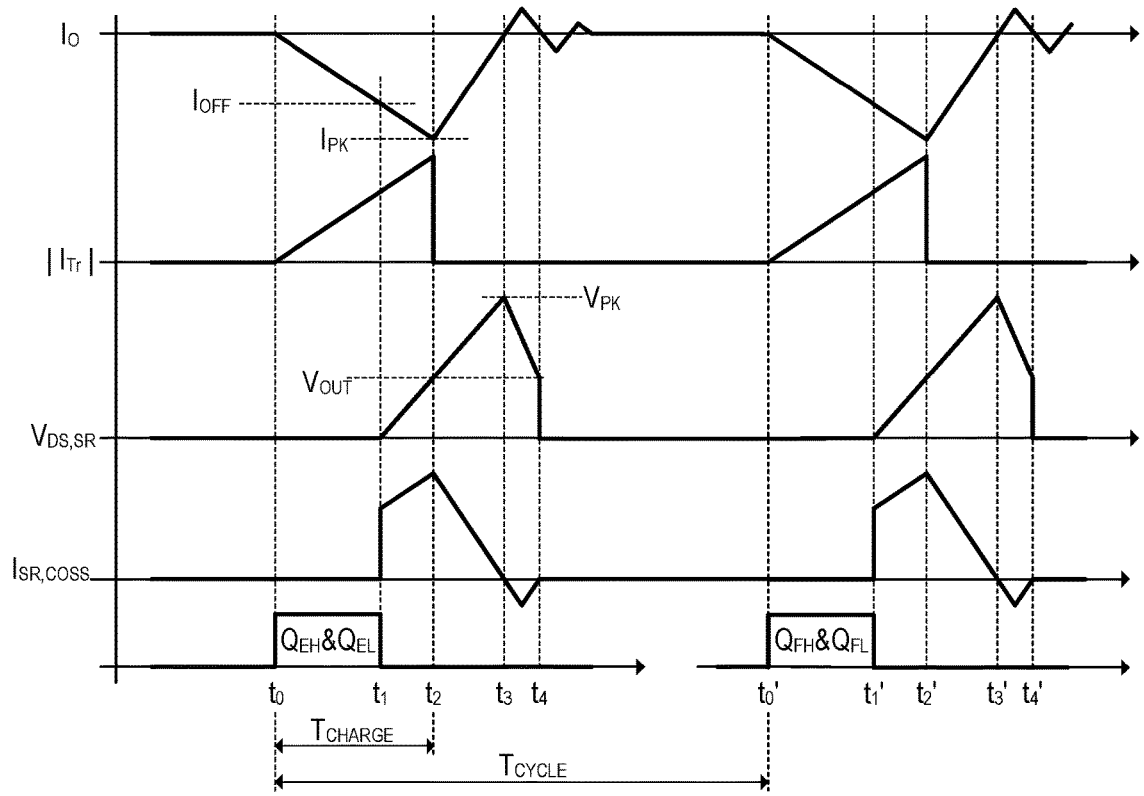
FIG. 6   (DCM operation)

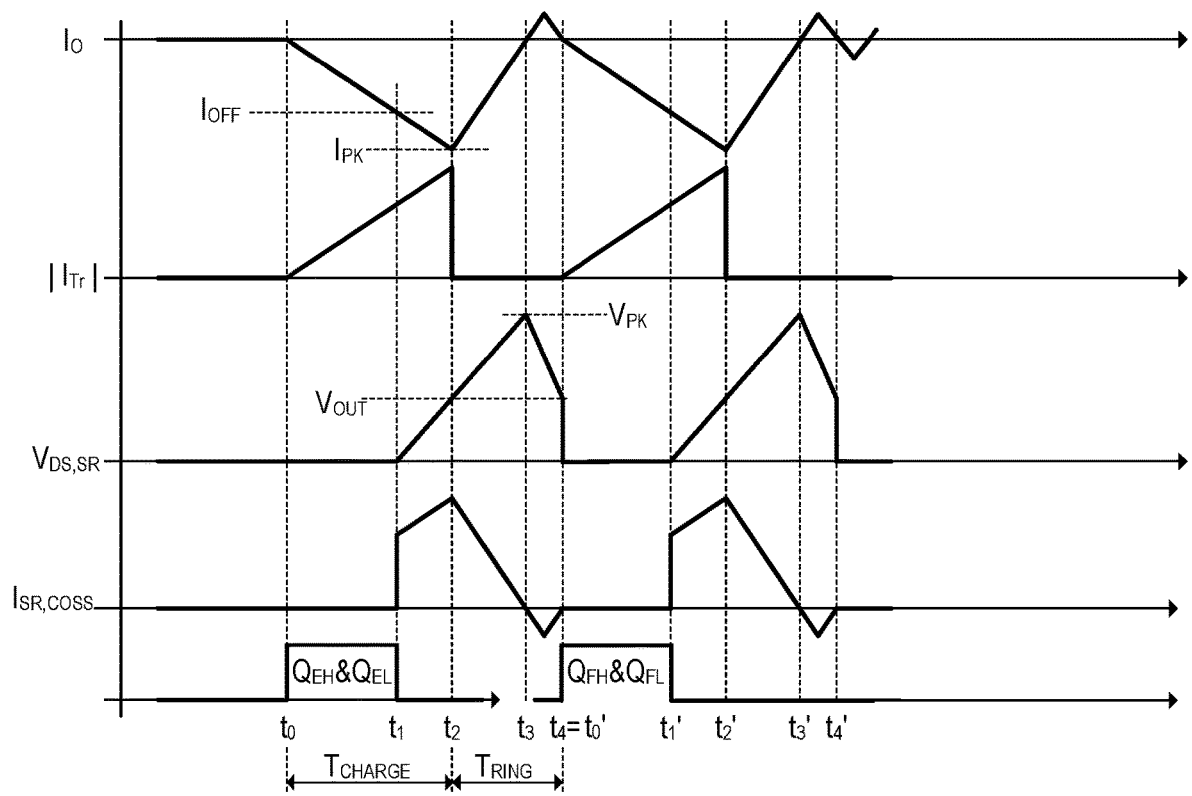
FIG. 7 (Boundary Mode operation)

(a)　　　　　　　　　　　　　　(b)

SWITCHING CONVERTER

RELATED APPLICATION

This application claims priority to earlier filed European Patent Application Serial Number EP20176781 entitled "SWITCHING CONVERTER," filed on May 27, 2020, the entire teachings of which are incorporated herein by this reference.

TECHNICAL FIELD

The present disclosure relates to the field of switching converters, in particular to a so-called phase-shifted full-bridge (PSFB) converter.

BACKGROUND

A PSFB converter can be used for DC-DC conversion in various applications. A PSFB converter provides voltage conversion, as well as galvanic isolation from the input line voltage, since this converter topology includes a transformer. Like other resonant or quasi-resonant converters, a PSFB converter can be operated to perform so-called Zero-Voltage-Switching (ZVS) with regard to the power transistors that switch the primary current passing through the transformer.

A bidirectional PSFB converter may require an auxiliary circuitry for the so-called cold start-up, during which large overshoots may occur in the electronic switches coupled to the secondary side of the transformer. Although some approaches to reducing the overshoots already exist, there is still a need for further improvement. In particular, in many cases it may be desirable to eliminate the need for the mentioned auxiliary circuitry.

SUMMARY

A phase-shifted full bridge (PSFB) switching converter is described herein. In accordance with one embodiment, the PSFB switching converter includes a transformer having a primary winding and a secondary winding; an input capacitor coupled to the primary winding via a first transistor full bridge; an output inductor coupled to the secondary winding via a synchronous rectifier circuit including at least one first transistor and at least one second transistor; and a controller circuit for generating switching signals for the rectifier circuit to operate the PSFB switching converter in reverse direction. In this regard, during a startup phase, at the beginning of which the input capacitor is substantially discharged, the at least one first transistor is switched on in each switching cycle to allow an inductor current to pass from an output node, via the output inductor and the secondary winding, to a ground node, wherein the at least one first transistor is again switched off when the inductor current reaches a threshold value. A new cycle begins when or some time after the inductor current has again reached zero.

Moreover, a corresponding method and a controller for operating a PSFB converter are described herein.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings:

FIGS. 3 to 5 illustrate the same circuit as FIG. 1 and additionally include arrows indicating the current flow represented by the timing diagrams of FIG. 2.

FIGS. 6 and 7 are timing diagrams illustrating two implementations of the concept shown in FIG. 2, namely Discontinuous Current Mode (DCM) operation and Boundary Mode operation.

DETAILED DESCRIPTION

Figure 1:
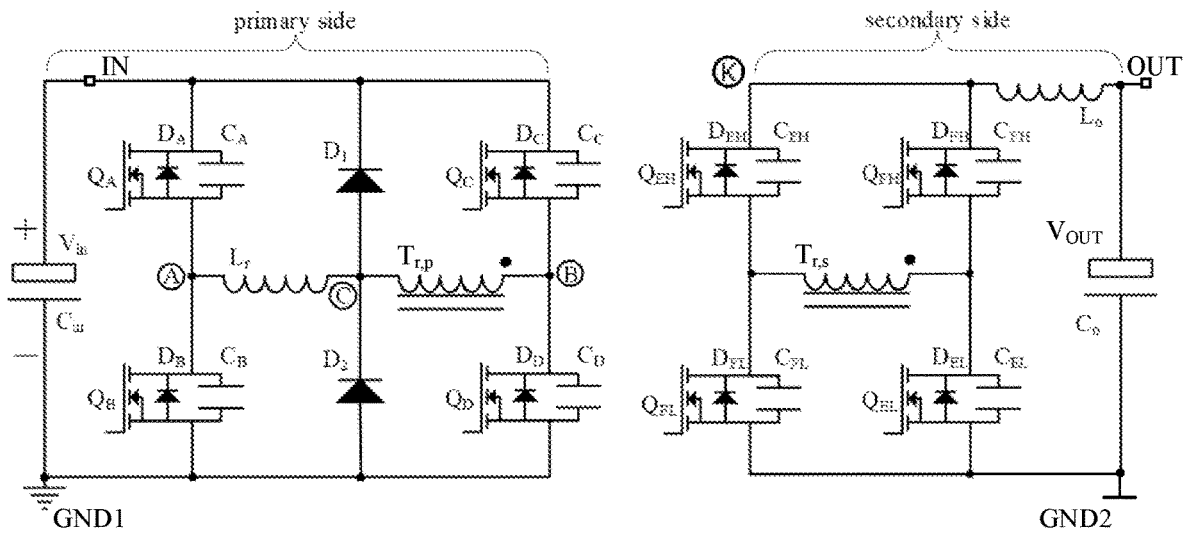
FIG. 1 illustrates one example of a PSFB converter.

Bidirectional converters are commonly used in uninterrupted power supplies (UPS) and battery based energy storage systems, into which charging and discharging functionalities are integrated in order to reduce volume and cost. UPS converters are usually AC/DC converters composed of two stages: first, an AC/DC stage providing power factor correction (PFC) and, second, a tightly regulated DC/DC stage providing isolation and battery management. Other applications like on-board chargers are in general designed to have bidirectional capability only in the DC/DC stage: they charge the battery from an AC/DC source and transfer energy from the battery to the motor, to other car systems or back to the grid (provided an external inverter is available). Further examples of bidirectional converter applications are found in battery manufacturing processes in which batteries are charged and partially discharged for testing: here a bidirectional DC/DC converter can reuse the discharging energy to charge other batteries, saving energy and costs.

Commonly used bidirectional DC/DC topologies are symmetric in their design and operate both in forward direction (herein referred as the charge of a battery or buck mode operation) and in reverse direction (herein referred as discharge of a battery or boost mode operation), wherein the converter operates basically in the same manner when working in both forward and reverse directions. However, this is achieved at the expense of added complexity, design compromises and a potential negative impact on efficiency, which may be lower than for unidirectional converters. This is the case for Dual Active Bridge (DAB) and LLC or CLLC resonant converters.

A PSFB converter is an isolated DC/DC converter topology that comprises a primary side full bridge at the input, a transformer for providing galvanic isolation, a rectification stage on the secondary side of the transformer, and an output LC filter. The rectification stage may have different configurations in which either a center-tapped, a current doubler or a full bridge rectifier composed of two diagonal transistor pairs (see FIGS. 1 and 9) is used. Each of these can provide certain advantages in different applications.

Although the PSFB converter is not a fully symmetric bidirectional converter, it is able to operate in reverse direction, during which it transfers power from the secondary side to the primary side of the transformer and operates as a current-fed isolated boost converter. When operating in reverse direction, the output filter inductance takes over the function of the boost inductor. The energy is stored in the filter inductance when the electronic switches on the secondary (or current-fed) side of the transformer connect the filter inductance between ground and the energy supply (e.g. the battery). The energy is transferred when one of the electronic switches on the secondary side is driven into an off-state, which forces the current to pass through the transformer secondary winding, thus transferring the power to the primary side. The primary (or voltage-fed) side of the converter acts as the rectification stage when operating in boost mode (reverse direction). The electronic switches on the primary side can be used as pure diode rectifiers, taking advantage of the intrinsic body diode of the devices. Alternatively, diodes may be connected in parallel to the switches whenever they do not have intrinsic body diodes or their electric characteristics make them unsuitable for diode operation (e.g. in case of Wide Band-Gap devices).

When operating in boost mode (reverse direction), a PSFB converter may exhibit relatively high voltage overshoots at the secondary-side switches, which increases electromagnetic interference (EMI) and compromises the reliability of the converter. This entails the need for electronic switches of a higher voltage class, which may result in a worse figure of merit (FOM) and an increase of converter losses. The overshoot is induced by the mismatch between the current of the boost inductor and other inductances in the converter at the start of a power transfer.

The problem of overshoots can be addressed by using special modulation schemes (switching schemes) for bidirectional operation of the PSFB converter. One approach is described in *M. Escudero et al., Modulation scheme for the bidirectional operation of the Phase Shift Full Bridge Power Converter, in: IEEE Trans. on Power Electronics, Vol. 35, Issue 2, February 2020* [Escudero]. However, using such modulation schemes may require additional auxiliary circuitry in order to enable a so-called "cold start" of the PSFB converter. Before discussing the mentioned cold-start of the PSFB converter in detail, one exemplary embodiment of a PSFB converter topology is described below with reference to FIG. 1.

FIG. 1 illustrates one exemplary implementation of a PSFB converter. Accordingly, the PSFB converter includes four power electronic switches that form a full-bridge on the primary side of a transformer. In the present example, the power electronic switches are implemented as metal-oxide-semiconductor field-effect transistors (MOSFETs) labeled $Q_A$, $Q_B$, $Q_C$, and $Q_D$, in FIG. 1. However, other types of power electronic switches such as IGBTs or the like may also be used. Each of the MOSFETs has an intrinsic reverse diode (body diode) labeled $D_A$, $D_B$, $D_C$, and $D_D$, respectively. In the depicted examples, the parasitic (intrinsic) drain-source capacitances of the MOSFETs are labeled $C_A$, $C_B$, $C_C$, and $C_D$, respectively.

The transistors $Q_A$ and $Q_B$ form a first half-bridge and the transistors $Q_C$ and $Q_D$ form a second half-bridge. Both half-bridges are connected between a first supply terminal IN (also labeled with a '+' in FIG. 1), at which an input voltage $V_{IN}$ is provided, and a second supply terminal (e.g. ground terminal GND1, also labeled with a '−' in FIG. 1), which is connected to a reference potential. The half-bridge output node B of the second half-bridge is connected to a first end of an inductor $T_{r,p}$, which is the primary winding of a transformer. The half-bridge output node A of the first half bridge is connected to a first end of a further inductor $L_r$. The second end of the inductor $T_{r,p}$ and the second end of the further inductor $L_r$ are connected at circuit node C, which is also coupled to the first supply terminal via free-wheeling diode $D_1$ and to the second supply terminal GND1 via free-wheeling diode $D_2$.

The inductor $T_{r,s}$, which is the secondary winding of the mentioned transformer, is connected to a further full bridge composed of the MOSFETs $Q_{EH}$ and $Q_{FL}$ (first half-bridge) and $Q_{FH}$ and $Q_{EL}$ (second half bridge). The intrinsic body diodes of the MOSFETs are denoted as $D_{EH}$, $D_{FL}$, $D_{FH}$ and $D_{EL}$, respectively; and the corresponding drain-source capacitances of the MOSFETs are labeled $C_{EH}$, $C_{FL}$, $C_{FH}$ and $C_{EL}$, respectively. When operating in forward direction (energy transfer from primary to secondary side), the intrinsic diodes $D_{EH}$, $D_{FL}$, $D_{FH}$ and $D_{EL}$ of the MOSFETs can operate as a bridge rectifier to rectify the inductor current passing through the secondary winding $T_{r,s}$. It is noted that, in specific embodiments, a synchronous rectification may be used by actively switching the MOSFETs $Q_{EH}$, $Q_{FL}$, $Q_{FH}$ and $Q_{EL}$ on and off. A further inductor Lo is connected between one output of the bridge rectifier (circuit node K in the example of FIG. 1) and an output terminal OUT of the PSFB converter, wherein the other output of the bridge rectifier is connected to reference terminal GND2 that forms the ground terminal for circuit components on the secondary side of the transformer. The capacitor $C_O$ is connected between the output terminal OUT and the reference terminal GND2. The inductor $L_O$ and the capacitor $C_O$ basically form a low-pass filter for reducing the ripple of the output voltage $V_{OUT}$. As mentioned above, when operating in reverse direction (energy transfer from secondary to primary side), the filter inductor $L_O$ takes over the role of a boost inductor of a boost converter.

It is understood that, in the examples described herein, the terms 'output' and 'input' (e.g. in 'output voltage', 'input capacitor', etc.) have actually the opposite of their normal meaning, as the circuit is operated in reverse direction during the cold start phase. For example, referring to FIG. 1, the 'output voltage' $V_{OUT}$ is actually the input voltage and the voltage across the 'input capacitor' $C_{in}$ is actually the output voltage, when energy is transferred from the secondary side to the primary side of the transformer.

Control signals (not shown in FIG. 1) for driving the power electronic switches (i.e. gate voltages for driving the gate electrodes of the MOSFETS $Q_A$, $Q_B$, $Q_C$, and $Q_D$, and $Q_{EH}$, $Q_{FL}$, $Q_{FH}$, and $Q_{EL}$) can be generated using any known technique. Usually, a modified pulse-width modulation is used to modulate the control signals in order to regulate the output voltage $V_{OUT}$. Suitable gate driver circuits for driving MOSFETs are as such known and thus not discussed here. The switching converter topology illustrated in FIG. 1 allows all the power electronic switches to switch with Zero Voltage Switching (ZVS), resulting in comparably low switching losses and an efficient power conversion.

In the following, operation in the reverse direction (boost mode operation) is considered. The voltage Your, which actually is the input voltage in boost mode operation, can be provided by a battery (low-voltage supply) and may be in a range of 42 to 58 volts. The input voltage $V_{IN}$, which is actually the output voltage across a high-voltage load in boost mode operation, may be in a range from 330 to 380 volts. It is understood that the mentioned voltage values are only examples and may also be higher or lower dependent on the actual application.

As mentioned, using the modulation/switching scheme described in [Escudero] entails the need for an auxiliary circuit that is connected between the ground terminal GND1 and input node IN. The auxiliary circuit includes an auxiliary supply which is decoupled from the load and the bidirectional converter by a high-voltage diode. The auxiliary supply charges the input capacitance $C_{IN}$ prior to starting the modulation scheme. For this purpose, the auxiliary supply includes a separate switching converter which adds significant complexity to the overall converter device.

In the following description, a novel modulation scheme is presented which enables the cold start of the bidirectional PSFB converter without requiring the above-mentioned auxiliary circuit and while still avoiding the above-mentioned voltage overshoots at the secondary side switches (e.g. MOSFETS $Q_{EH}$, $Q_{FL}$, $Q_{FH}$, and $Q_{EL}$) and while keeping the current passing through the filter inductor $L_O$ under control.

One example of the concept described herein is explained below with reference to FIG. 2, which illustrates one cycle of a periodic modulation scheme used in a cold start phase of the PSFB of FIG. 1. As mentioned, the PSFB operates in reverse direction in the cold start phase and the subsequent boost mode operation. The transistors $Q_{EH}$, $Q_{FL}$, $Q_{FH}$, and $Q_{EL}$ form a so-called synchronous bridge rectifier (transistor H-bridge), wherein the transistor pair $Q_{EH}$ and $Q_{EL}$ are denoted as a first diagonal transistor pair and the transistor pair $Q_{FH}$ and $Q_{FL}$ are denoted as a second diagonal transistor pair of the rectifier bridge. According to the timing diagrams in FIG. 2, for times before time instant $t_0$ (t<$t_0$), both transistor pairs are inactive (switched off) and the first diagonal pair $Q_{EH}$ and $Q_{EL}$ is activated (switched on) at time instant to. Starting at time instant to, the inductor current $I_O$ passing through the inductor $L_O$ starts to rise (from zero to higher negative values) until the inductor current $I_O$ reaches the value $I_{OFF}$ at time instant $t_1$. In the time interval from $t_0$ to $t_1$ the current circulates from the circuit node OUT, via inductor $L_0$, transistor $Q_{EH}$, secondary winding $T_{r,s}$ of the transformer, and transistor $Q_{EL}$ to ground node GND2. This situation is shown in FIG. 3, which shows the same circuit as FIG. 1, wherein additional arrows indicate the current flow. During the same time interval (from $t_0$ to $t_1$), a current $I_{Tr}$ is induced in the primary winding $T_{r,p}$ of the transformer, which is proportional to the current $I_O$. That is, $I_{Tr}=I_O N_S/N_p$, wherein $N_p$ denotes the number of turns of the primary winding $T_{r,p}$ and $N_S$ denotes the number of turns of the secondary winding $T_{r,s}$. In other words, energy is transferred from the secondary side to the primary in the time interval from between $t_0$ and $t_1$.

At time instant $t_1$ (when the inductor current $I_O$ reaches the value $I_{OFF}$) the first diagonal transistor pair $Q_{EH}$, $Q_{EL}$ is switched off and the energy stored in the inductor $I_O$ starts to resonate between the inductor $L_O$ and the (intrinsic) output capacitors $C_{EH}$, $C_{EL}$, $C_{FH}$, $C_{FL}$ of the rectifier bridge. For a short time interval from $t_1$ to $t_2$ the inductor current $I_O$ (and thus also the primary current $I_{Tr}$ of the transformer) continues to rise while the capacitors $C_{EH}$ and $C_{EL}$ of the (now switched-off) first diagonal transistor pair are being charged. During the same time interval, starting at $t_1$ the voltage drop across the transistors $Q_{EH}$ and $Q_{EL}$ rises. In the time interval from $t_1$ to $t_2$ the current circulates from the circuit node OUT, via inductor $L_O$, capacitor $C_{EH}$, secondary winding $T_{r,s}$ of the transformer, and capacitor $C_{EL}$ to ground node GND2. This situation is shown in FIG. 4, which shows the same circuit as FIG. 1, wherein again the arrows indicate the current flow. The capacitor current $I_{SR,Coss}$ passing through the capacitors $C_{EH}$ and $C_{EL}$ is shown in the fourth diagram (from the top) in FIG. 2. It is noted that $V_{DS,SR}$ denotes the total voltage drop across the full bridge (cf. FIG. 2, third diagram). That is, assuming that the capacitances $C_{EH}$, $C_{EL}$, $C_{FH}$, and $C_{FL}$ are equal, the drain-source voltage across each one of the transistors $C_{EH}$, $C_{EL}$, $C_{FH}$, and $C_{FL}$ is $V_{DS,SR}/2$.

On the primary side and in the time intervals from $t_0$ to $t_1$ and $t_1$ to $t_2$, the induced current $I_{Tr}$ circulates from the primary winding $T_{r,p}$ via free-wheeling diode $D_1$, input capacitor $C_{IN}$, and reverse diode $D_D$ of inactive transistor $Q_D$ back to the primary winding $T_{r,p}$. The inductor $L_r$ and the reverse diode $D_A$ of transistor $Q_A$ form an alternative current path parallel to diode $D_1$. This situation is illustrated in FIGS. 3 and 4. As can be seen from FIGS. 3 and 4, the induced current $I_{Tr}$ charges the input capacitor $C_{IN}$.

Figure 2:
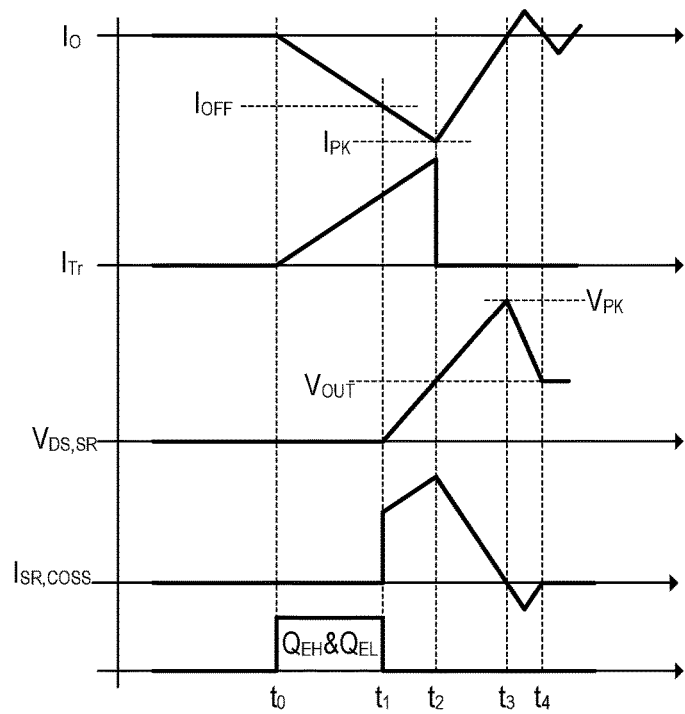
FIG. 2 includes timing diagrams illustrating one cycle of a modulation scheme that can be used in a cold start phase of the PSFB converter.

As shown in the timing diagrams of FIG. 2, the amplitude of the inductor current $I_O$ decreases (i.e. the current becomes less negative) starting from time instant $t_2$. At time $t_3$, the inductor current $I_O$ reaches zero amperes. Also at time instant $t_2$, the voltage drop $V_{DS,SR}$ across the transistors $Q_{EH}$ and $Q_{EL}$ (and thus across the respective intrinsic capacitors $C_{EH}$ and $C_{EL}$) further increases and creates an overshot up to the peak value $V_{PK}$. The situation is the same for transistors $Q_{FH}$ and $Q_{FL}$, i.e. in time interval $t_4$-$t_2$ all transistors are off and have the same drain-source-voltage $V_{DS,SR}/2$. In the time interval from $t_2$ to $t_3$ the current through the transformer windings $T_{r,p}$, $T_{r,s}$ is substantively zero. As the voltage $V_{DS,SR}$ reaches its peak value $V_{PK}$ at time instant $t_3$, the current $I_{SR,Coss}$ through the capacitors $C_{EH}$ and $C_{EL}$ reaches zero. By this time, the energy previously stored in the inductor $L_O$ has been transferred to the output capacitors $C_{EH}$, $C_{EL}$, $C_{FH}$ and $C_{FL}$ of the rectifier bridge. The current circulation between time instant $t_2$ and $t_3$ is indicated in FIG. 5, which shows the same circuit as FIG. 1 with additional arrows indicating the current flow.

As shown in FIG. 2, in the time interval from $t_3$ to $t_4$, the voltage $V_{DS,SR}$ decreases from its peak value $V_{PK}$ to its stationary value $V_O$ and a new cycle can be initiated (e.g. by activating the other diagonal transistor pair $Q_{FH}$ and $Q_{FL}$) either at time $t_4$ or later after a defined pause. A switching operation, in which the next cycle starts directly at the end of the preceding cycle (see, FIG. 2, time $t_4$), is usually referred to as Boundary Mode (BM) operation, and a switching operation, in which the next cycle starts after a modulation pause at the end of the preceding cycle is referred to as Discontinuous Current Mode (DCM) operation. During the modulation pause, all secondary side switches $Q_{EH}$, $Q_{EL}$, $Q_{FH}$, $Q_{FL}$, are in an off state (non-conductive).

DCM operation is illustrated in the timing diagrams of FIG. 6. In this example, the switching scheme of FIG. 2 in the interval from time $t_0$ to time $t_4$ is regularly repeated with a fixed frequency f=$T_{CYCLE}^{-1}$. The effective on-time is $T_{CHARGE}=t_2-t_0$. During this time period, the input capacitor $C_{in}$ is charged, and the charge $\Delta Q_{C_{in}}$ added to the capacitor charge in each cycle is $$\Delta Q_{C_{in}} = \int_{t_o}^{t_2} I_{Tr} dt = \frac{1}{2} I_{Pk} \frac{N_S}{N_P}(t_2 - t_0) = \frac{N_S}{N_P} I_{Pk} \frac{T_{CHARGE}}{2}. \quad (1)$$

The above equation is based on the assumption that the slope of the primary side current $I_{Tr}(t)$ is linear. In this case the peak value of the primary side current $I_{Tr}(t)$ at time instant $t_2$ equals $I_{Pk}N_S/N_p$. As mentioned above, the current threshold $I_{OFF}$ is used to trigger the switch-off of the currently active diagonal transistor pair ($Q_{EH}$ and $Q_{EL}$ are switched off when the inductor current $I_O$ reaches the threshold $I_{OFF}$). In view of the above equation, the voltage increase $\Delta V_{in}$ at the input capacitor $C_{in}$ in each cycle is $$\Delta V_{in} = \frac{\Delta Q_{C_{in}}}{C_{in}} = \frac{N_S}{N_P} I_{Pk} \frac{T_{CHARGE}}{2C_{in}}. \quad (2)$$

That is, in the cold start phase, the voltage $V_{in}$ the input capacitor $C_{in}$ increases by $\Delta V_{in}$ in each cycle. The time $T_{CHARGE}$ is indirectly determined by the threshold $I_{OFF}$.

It can be seen from FIGS. 2 and 6 that the higher the (absolute value of) threshold $I_{OFF}$ is, the longer the time intervals $t_1$–$t_0$ and $T_{CHARGE}$ and the higher the peak current $I_{Pk}$ and the peak voltage $V_{Pk}$ across the transistor bridge will be. Setting (as a design choice) the maximum allowable peak voltage $V_{Pk}$ to a specific value (e.g. 80% of the breakdown voltage of the transistors) implies a specific maximum for the current threshold $I_{OFF}$ and for the peak current $P_{Pk}$ and limits the voltage swing $\Delta V_{in}$ that can be achieved in each cycle.

The duty cycle in DCM operation is $T_{CHARGE}/T_{CYCLE}$, wherein the cycle period $T_{CYCLE}$ is larger than $t_4$–$t_0$. The case in which the cycle period $T_{CYCLE}$ equals the time interval $t_4$–$t_0$ is referred to as Boundary Mode operation and is illustrated by the timing diagrams of FIG. 7. In both figures, FIG. 6 and FIG. 7, the corresponding time instants in the first and the second cycle are denoted as $t_0$ and $t_0'$, $t_1$ and $t_1'$, . . . , and $t_4$ and $t_4'$. In Boundary Mode $t_0'=t_4$ holds true. In Boundary Mode operation, the cycle period $T_{CYCLE}$ is variable and equals the sum of the on-time $T_{CHARGE}$ and the ringing time $T_{RING}$ (see FIG. 7). The ringing time $T_{RING}$ depends on the inductance of inductor $L_O$ and the total capacitance $C_{OSS,SR}$ of the transistor bridge (assuming $C_{EH}=C_{EL}=C_{FH}=C_{FL}=C_{OSS,SR}$). The ringing time $T_{RING}$ equals approximately half of the oscillation period of the LC-circuit formed by inductor $L_O$ and the capacitance $4C_{OSS,SR}$. Accordingly, the ringing time is $$T_{RING}=t_4-t_2\approx \pi\sqrt{L_O \cdot 4C_{OSS,SR}} \qquad (3)$$

The relation between the current values $I_{OFF}$ and $I_{Pk}$ and the corresponding time intervals $t_2$–$t_0$ and $t_1$–$t_0$ can be analyzed when considering the total electromagnetic energy stored at the secondary side of the transformer. Accordingly, at time $t_1$ the total energy stored in the inductor $L_O$ is $L_O I_{OFF}^2/2$ (i.e. the energy stored in inductor $L_O$ when $I_O(t_1)=I_{OFF}$); the total energy can be determined by adding the energy stored in the capacitances $C_{EH}$, $C_{EL}$, $C_{FH}$, $C_{FL}$ of the transistor bridge. Thus, the current overshoot $I_{Pk}-I_{OFF}$ beyond the threshold $I_{OFF}$ is determined by the energy stored in the capacitances $C_{EH}$, $C_{EL}$, $C_{FH}$, $C_{FL}$ of the transistor bridge. As mentioned, this total energy oscillates between the capacitances $C_{EH}$, $C_{EL}$, $C_{FH}$, $C_{FL}$ and the inductor $L_O$. Thus, the maximum voltage $V_{PK}$, as well as the peak current $I_{PK}$, are determined by the total energy stored at the secondary side of the transformer.

It can be shown that the charging state of the input capacitor $C_{in}$ (i.e. the voltage $V_{in}$) has only little effect on the threshold value $I_{OFF}$. Accordingly, the threshold value $I_{OFF}$ may be set to a constant value in a specific embodiment. It is not noted, however, that the duty cycle $T_{CHARGE}/T_{CYCLE}$ will vary in DCM operation, as the slope of the inductor current $I_O(t)$ depends on the charging state of the input capacitor $C_{in}$.

The cold start phase, during which the modulation scheme of FIG. 2 is applied, ends when the voltage $N_S V_{in}/N_P$ (input voltage $V_{in}$ scaled by the winding ratio $N_S/N_P$ of the transformer) is smaller than the voltage $V_{OUT}$ (i.e. $V_{in}/N_P<V_{OUT}$). When the input voltage $V_{in}$ exceeds the value $N_P V_{OUT}/N_S$, a different modulation scheme such as, for example, the modulation scheme as described in [Escudero] can be used.

Figure 8:
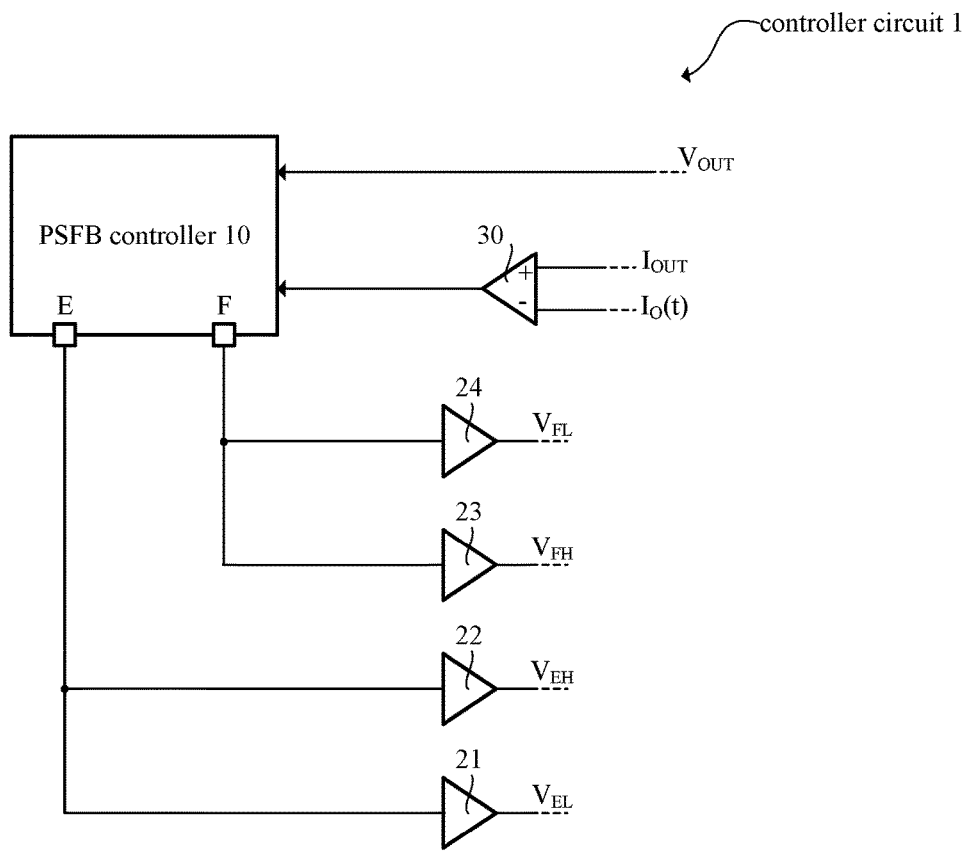
FIG. 8 is a schematic diagram illustrating a PSFB controller configured to output drive signals for the secondary side transistor bridge.

FIG. 8 is a schematic diagram illustrating a PSFB controller 10 configured to output drive signals for the secondary side transistor bridge. In the example of FIG. 8, the controller may be implemented as a microcontroller or any other programmable device, which may include a processor for executing software instructions. The PSFB controller 10 may be configured or programmed to generate logic signals E and F according to the modulation scheme described herein. The logic signals E and F indicate the desired switching state of the first diagonal transistor pair (transistors $Q_{EH}$ and $Q_{EL}$) and the second diagonal transistor pair (transistors QFH and QFL). The gate drivers 21, 22, 23, and 24 generate the actual gate voltages $V_{EH}$, $V_{EL}$, $V_{FH}$, and $V_{FL}$ for the respective transistors $Q_{EH}$, $Q_{EL}$, $Q_{FH}$, and $Q_{FL}$. A comparator 30 signals the condition $I_{OFF}\le|I_O(t)|$ (cf. FIG. 2) to the PSFB controller 10. As shown in the example of FIG. 6 (DCM operation), a diagonal transistor pair (e.g. transistors $Q_{EH}$ and $Q_{EL}$ or $Q_{FH}$ and $Q_{FL}$) is switched on regularly in accordance with a clock signal (not shown) and switched-off when the condition $I_{OFF}\le|I_O(t)|$ evaluates true. In the example of FIG. 7, switch-on of the transistor pairs is not triggered by a clock signal. Instead, the second diagonal transistor pair is switched on after a fixed delay time following the switch-off of the first diagonal transistor pair. This delay time equals the ring time $T_{RING}$ and may be a constant parameter for a specific implementation.

At this point it should be noted that numerical values of circuit parameters such as the threshold value $I_{OFF}$ can be specifically designed for each application and verified, e.g. by simulating the circuit of FIG. 1 for the modulation scheme of FIG. 6 or FIG. 7. Alternatively, the circuit parameters can be estimated using analytical calculations based on physical models.

Figure 9:
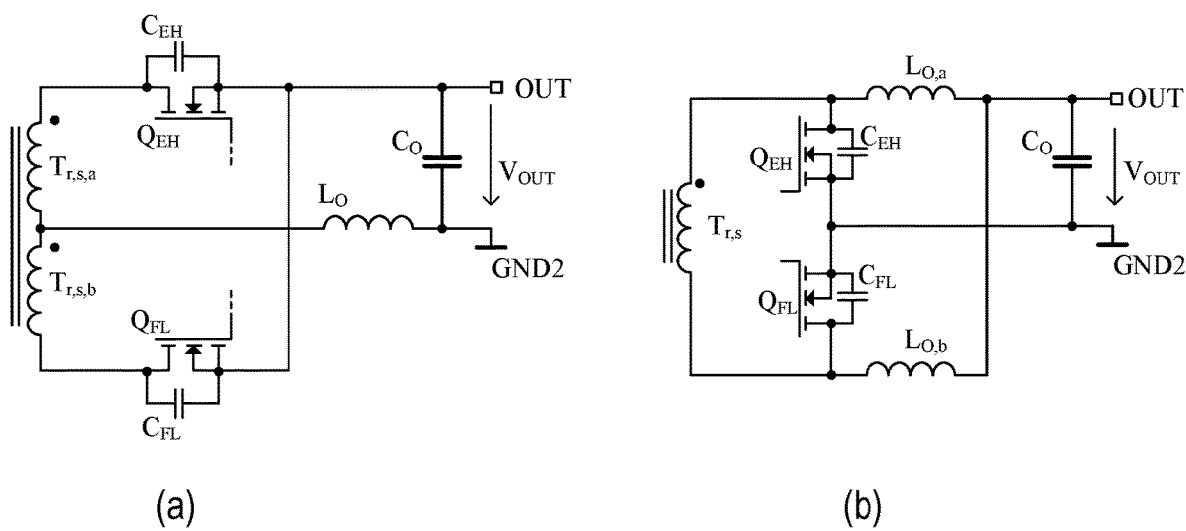
FIG. 9 illustrates two exemplary alternative implementations of the secondary side of the PSFB converter of FIG. 1.

As mentioned further above, the synchronous rectifier circuit on the secondary side of a PSFB switching converter can be implemented in various different ways. In the examples discussed above, the secondary side rectifier circuit is implemented using a transistor full-bridge (synchronous bridge rectifier). Alternatives to a bridge rectifier, for example, a center-tapped rectifier or a current doubler rectifier may also be used. Exemplary implementations are shown in FIG. 9, diagrams (a) and (b). The concepts described herein for operating a PSFB switching converter in reverse direction during a cold start phase (in which the input capacitor $C_{in}$ is substantially discharged) are readily applicable to PSFB switching converters with secondary side rectifier stages different from bridge rectifiers.

The alternative shown in FIG. 9, diagram (a) requires a secondary winding $T_{r,s}$ with a center tap that effectively divides the secondary winding in a first partial coil $T_{r,s,a}$ and a second partial coil $T_{r,s,b}$. The output inductor $L_O$ is connected between the center tap (i.e the common circuit node of the partial coils $T_{r,s,a}$ and $T_{r,s,b}$) and the ground node GND2. The two outer terminals of the secondary winding are connected to the output terminal OUT via the transistors $Q_{EH}$ and $Q_{FL}$. That is, the drain-source current paths of the transistors $Q_{EH}$ and $Q_{EL}$ are coupled in series to the secondary winding (partial coils $T_{r,s,a}$ and $T_{r,s,b}$. Similar as in the example of FIG. 1, an output capacitor $C_O$ is connected between the output terminal OUT and ground node GND2. It is noted that the intrinsic reverse diodes of the transistors are not shown in the diagrams of FIG. 1 to keep the drawings simple. Again it should be noted that—in the examples described herein—the PSFB switching converter is operated in reverse direction, which means that the output voltage $V_{OUT}$ has to be considered as input voltage supplied to the output node OUT.

The timing diagrams of FIG. 2 are, for the most part, also valid for the center tap rectifier of FIG. 9, Diagram (a), wherein only one transistor, either $Q_{EH}$ or $Q_{FL}$, is activated in each cycle instead of a diagonal transistor pair as it is the case in the example of FIG. 1. The two transistors $Q_{EH}$ and $Q_{FL}$ can be activated alternatingly in subsequent cycles. When transistor $Q_{EH}$ is switched on, the inductor current $I_O(t)$ passes from the output node OUT through transistor $Q_{EH}$, secondary winding $T_{r,s,a}$ and inductor $L_O$ to ground GND2. The inductor current $I_O(t)$ rises until the threshold value $I_{OFF}$ is reached, which triggers a switch-off of transistor $Q_{EH}$ (cf. FIG. 2, time $t_1$). Due to the energy stored in the capacitance $C_{EH}$ the inductor current $I_O(t)$ continues to rise a bit further until the peak current $I_{PK}$ is reached (cf. FIG. 2, time $t_2$). The energy stored in inductor $L_O$ and capacitance $C_{EH}$ oscillates as the inductor current $I_O$ decreases. At the same time the voltage across the transistor $Q_{EH}$ rises and generates an overshot at $V_{PK}$ when the inductor current $I_O$ reaches zero (cf. FIG. 2, time $t_3$). When the voltage $V_{DS,SR}$ across the transistor $O_{EH}$ again reaches the nominal value $V_{OUT}$, a new cycle can begin (immediately when operating in boundary mode or after a modulation pause when operating in DCM). When, in the next cycle, the other transistor $O_{FL}$ is switched on, the function is basically the same as described above.

The alternative shown in FIG. 9, diagram (b) requires split output inductors $L_{O,a}$ and $L_{O,b}$. The output inductors $L_{O,a}$ and $L_{O,b}$ can also be seen as one inductor with a center tap which is connected to the output terminal OUT. The two outer terminals of the inductors $L_{O,a}$ and $L_{O,b}$ are connected to opposing ends of the secondary winding $T_{r,s}$. Further, the two outer terminals of the inductors $L_{O,a}$ and $L_{O,b}$ are connected to ground node GND2 via transistor $Q_{EH}$ and transistor $Q_{FL}$, respectively. As in the other examples, the output capacitor $C_O$ is connected between the output node and the ground node GND2.

The timing diagrams of FIG. 2 are, for the most part, also valid for the current doubler rectifier of FIG. 9, Diagram (b), wherein only one transistor, either $Q_{EH}$ or $Q_{FL}$, is activated in each cycle. Also in this example, the two transistors $Q_{EH}$ and $Q_{FL}$ can be activated alternatingly in subsequent cycles. When transistor $Q_{EH}$ is switched on, the inductor current $I_O(t)$ passes from the output node OUT through inductor $L_{O,b}$, secondary winding $T_{r,s,a}$ and transistor $Q_{EH}$ to ground GND2. A parallel current path is available via inductor $L_{O,a}$ and transistor $Q_{EH}$. The inductor current $I_O(t)$, which passes through inductor $L_{O,b}$ and secondary winding $T_{r,s,a}$, rises until the threshold value $I_{OFF}$ is reached which triggers the switch-off of transistor $Q_{EH}$ (cf. FIG. 2, time $t_1$). Due to the energy stored in the capacitance $C_{EH}$ the inductor current $I_O(t)$ rises a bit further until the peak current $I_{PK}$ is reached (cf. FIG. 2, time $t_2$), and the energy stored in inductors $L_{O,a}$ and $L_{O,a}$ and capacitance $C_{EH}$ oscillates as the inductor current $I_O$ decreases. At the same time the voltage across the transistor $Q_{EH}$ rises and generates an overshot at $V_{PK}$ when the inductor current $I_O$ reaches zero (cf. FIG. 2, time $t_3$). When the voltage $V_{DS,SR}$ across the transistor $O_{EH}$ again reaches the nominal value $V_{OUT}$, a new cycle can begin (according to BM or DCM operation). When, in the next cycle, the other transistor $O_{FL}$ is switched on, the function is basically the same as described above.

It is understood that the name (phase-shifting) full bridge switching converter relates to the transistor full bridge coupled to the primary winding $T_{r,p}$ (see FIG. 1, transistors $Q_A$, $Q_B$, $Q_C$, $Q_D$) which can be implemented as shown in FIG. 1 and combined with various synchronous rectifier circuits (e.g. full bridge, center-tapped, current doubler, etc.) coupled to the secondary side of the transformer. When operating in reverse direction in the startup (cold start) phase, at the beginning of which the input capacitor $C_{in}$ is substantially discharged, the full bridge on the primary side (transistors $Q_A$, $Q_B$, $Q_C$, $Q_D$) can operate passively, which means that current passes through the transistors' intrinsic reverse diodes whereby the transistors are not actively switched on.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

The invention claimed is:

1. A phase-shifted full bridge (PSFB) switching converter comprising:
   a transformer having a primary winding and a secondary winding;
   an input capacitor coupled to the primary winding via a first transistor full bridge;
   an output inductor coupled to the secondary winding via a synchronous rectifier circuit including at least one first transistor and at least one second transistor;
   a controller circuit configured to generate switching signals for the synchronous rectifier circuit to operate the PSFB switching converter in a reverse direction;
   wherein, during a startup phase, at a beginning of which the input capacitor is substantially discharged:
      the at least one first transistor is switched ON at a beginning of each switching cycle of controlling the switching converter to allow an inductor current to pass from an output node, via the output inductor and the secondary winding to a ground node;
      the at least one first transistor is switched OFF when the inductor current reaches a threshold value; and
      wherein a new cycle starts responsive to the inductor current reaching zero.

2. The PSFB switching converter of claim 1, wherein, during the startup phase, a cycle period is constant and the PSFB switching converter operates in Discontinuous Current Mode.

3. The PSFB switching converter of claim 1, wherein the at least one first transistor is switched on at the beginning of a first switching cycle and the at least one second transistor is switched on at the beginning of a second switching cycle, which starts at the end of the first switching cycle.

4. The PSFB switching converter of claim 1, wherein, while the at least one first transistor or the at least one second transistor is switched on, the secondary winding is electrically coupled in series to the output inductor.

5. The PSFB switching converter of claim 1, wherein the first transistor full bridge includes two half-bridges, each having a middle tap; and
   wherein the middle taps of the two half-bridges are coupled via the primary winding and a further inductor.

6. The PSFB switching converter of claim 5, wherein a common circuit node, at which the primary winding and the further inductor are connected, is coupled to a first terminal and a second terminal of the input capacitor via a first free-wheeling diode and a second free-wheeling diode, respectively.

7. The PSFB switching converter of claim 1, wherein the controller circuit is operative to generate, after the startup phase when the input capacitor is charged up to a specific voltage level, switching signals for the at least one first transistor and the at least one second transistor to operate the PSFB switching converter in a reverse direction using a different modulation scheme than in the startup phase.

8. The PSFB switching converter of claim 1, wherein the synchronous rectifier circuit includes a bridge rectifier, and the at least one first transistor includes a first diagonal transistor pair and the at least one second transistor includes a second diagonal transistor pair.

9. The PSFB switching converter of claim 1 wherein the synchronous rectifier circuit includes a center-tapped rectifier.

10. The PSFB switching converter of claim 1 further comprising:
an output capacitor connected between the output node and the ground node.

11. The PSFB switching converter of claim 1, wherein, in each switching cycle, an electric charge, which depends on the inductor current) integrated over one switching cycle, is transferred across the transformer causing the input capacitor to be charged.

12. A method for operating a phase-shifted full bridge (PSFB) switching converter in a reverse direction,
wherein the PSFB switching converter comprises a transformer having a primary winding and a secondary winding, an input capacitor coupled to the primary winding via a first transistor full bridge; and an output inductor coupled to the secondary winding via a synchronous rectifier circuit including at least one first transistor and at least one second transistor;
during a startup-phase, at the beginning of which an input capacitor of the PSFB switching converter is substantially discharged, the method comprises for each switching cycle:
switching on the at least one first transistor at the beginning of each switching cycle to allow an inductor current to pass from an output node, via the output inductor and the secondary winding to a ground node; and
switching off the at least one first transistor when the inductor current reaches a threshold value; and
wherein a new cycle starts responsive to the inductor current reaching zero.

13. The method of claim 12, wherein, during the startup phase, the cycle period is constant and the PSFB switching converter operates in Discontinuous Current Mode.

14. The PSFB switching converter of claim 12, wherein, while the at least one first transistor or the at least one second transistor is switched on, the secondary winding is electrically coupled in series to the output inductor.

15. A controller circuit for controlling the operation of a phase-shifted full bridge switching converter,
wherein the controller circuit includes a processor and a memory storing software instructions, which, when executed by the processor, cause the controller to perform the method of claim 12.

16. The PSFB switching converter of claim 1, wherein a cycle period is variable and the PSFB switching converter operates in Boundary Mode, wherein the new cycle is started when the inductor current reaches zero.

17. The method of claim 12, wherein a cycle period is variable and the PSFB switching converter operates in Boundary Mode, wherein the new cycle is started when the inductor current reaches zero.

\* \* \* \* \*